US006299944B1

(12) United States Patent
Trapani

(10) Patent No.: US 6,299,944 B1
(45) Date of Patent: *Oct. 9, 2001

(54) METHOD OF CURING COATING COMPOSITIONS

(75) Inventor: Andrew Paul Trapani, Valbonne (FR)

(73) Assignee: Rohm and Haas Company, Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,126

(22) Filed: Nov. 6, 1997

(30) Foreign Application Priority Data

Nov. 6, 1996 (FR) .................................................. 96 13542

(51) Int. Cl.[7] .......................................................... C08F 2/46

(52) U.S. Cl. ....................... 427/493; 427/136; 427/385.5; 427/407.1; 427/508; 427/558; 427/559; 522/4

(58) Field of Search .................................... 427/493, 508, 427/558, 559, 407.1, 385.5, 136; 522/4

(56) References Cited

U.S. PATENT DOCUMENTS

| | | | |
|---|---|---|---|
| 3,506,467 | 4/1970 | Ulrich . | |
| 4,016,334 | 4/1977 | Collins et al. . | |
| 4,055,001 | 10/1977 | Exxon . | |
| 5,859,135 * | 1/1999 | Doomen et al. ...................... | 525/123 |

FOREIGN PATENT DOCUMENTS

| | | |
|---|---|---|
| WO97/47398 | 12/1997 | (DE) . |
| 59139839 | 8/1984 | (JP) . |
| 59221360 | 12/1984 | (JP) . |
| WO 90/02613 | 3/1990 | (WO) . |

* cited by examiner

*Primary Examiner*—Bernard Pianalto
(74) *Attorney, Agent, or Firm*—Karl Stauss

(57) ABSTRACT

The present invention provides a method of curing a waterborne coating composition comprising the steps of:

a) applying the waterborne coating composition, which comprises polymer solids of which at least 5% by weight thereof is UV curable, to a substrate;

b) irradiating the coated substrate with microwave radiation; and c) irradiating the coated substrate with UV radiation.

8 Claims, No Drawings

METHOD OF CURING COATING COMPOSITIONS

The invention concerns a method of curing aqueous coating compositions involving the use of radiation, and to radiation-curable aqueous coating compositions.

Methods involving the use of microwave radiation for curing waterborne coatings on substrates have been known for some years. For example, a method of forming a film of a water containing paint on a temperature sensitive substrate and then irradiating the coated substrate with microwaves to cure the coating is disclosed in WO 90/02613. The method is described to provide rapid curing of both zinc silicate paints and emulsion paint systems on temperature sensitive substrates that would otherwise be damaged by the stoving conditions normally required for curing, and to enable paint films to be cured very rapidly in on-line apparatus.

As documented in WO 90/02613, the vast majority of waterborne coatings contain some volatile plasticizers known in the art as coalescents. These coalescents are needed to ensure that during the drying process the polymer is soft enough to form a proper film and then later they evaporate and leave behind a hard resistant coating. Though microwave treatment of such coatings produces a rapid evaporation of the water, the slower evaporating coalescents tend to stay behind in the coating which, until they have evaporated from the coating, leave it insufficiently hard for the coated substrates to be stacked and stored shortly after treatment, otherwise they stick together so causing considerable damage when they are eventually separated again. Even though the problems of blocking and poor stackability as a result of using emulsion paints containing a coalescent material to reduce the minimum film forming temperature is mentioned in WO 90/02613, and this prior art appears to be directed to solving this problem, it particularly concentrates on providing a method of curing zinc silicate paint systems. We have found that adequate results for emulsion type coating compositions containing coalescents cannot be obtained by following the teaching of WO 90/02613; the coated substrates stick together when stacked a short time after microwave treatment.

UV curable compositions have been used industrially for some time, including as compositions for coating substrates. These compositions may be high solids compositions which contain low quantities or no volatile components, or lower solids, diluent or solvent-based compositions which contain significant quantities of volatile components such as organic solvents or water. The UV curable component may be, for example, an unsaturated pre-polymer. It has been recognized that the use of such UV curable unsaturated pre-polymers in aqueous coating compositions is particularly advantageous for environmental and ease of application reasons since, with water as the diluent, the viscosity can be regulated as much as is desired without having to add a polluting, volatile organic solvent and the inherent non-polluting nature of a UV-curing coating is not diminished by adjusting its viscosity. Waterborne UV-curing coatings can be easily and safely applied by spraying (automatic or manual), curtain coater, flow coater or roller coater. Further, because of the evaporation of the water during the drying process (and the resulting film shrinkage this entails), the gloss of these coatings is readily controlled by the addition of low amounts of standard flatting agents known in the art (e.g. amorphous silicas). Nevertheless, even with these advantages, waterborne UV-curing coatings have an important constraint: the water contained in the freshly applied film must be nearly completely evaporated before the coating is UV-cured. If it is not, water will be permanently trapped in the film and this will compromise the stain resistance of the coating and adversely affect the appearance of a transparent coating (introduction of haze). This preferred requirement of evaporating the water prior to UV-exposure means that the drying phase of a waterborne UV-curing coating takes longer than that of a 100% non-volatile UV-curing coating. As an example, it is common for the time between application and stacking of a 100% non-volatile UV-curing coating to be as short as 1 minute while for a waterborne UV-curing coating this same time might be 10 minutes or more. The industrial use of waterborne UV-curing coating thus suffers from a loss of productivity in comparison to the 100% non-volatile UV-curing coating. Productivity of a modern industrial process is extremely important and thus even though waterborne UV-curing coatings offer several advantages over 100% non-volatile UV-curing coatings, waterborne UV has not been able to realize its full potential due to its lower productivity.

The object of the present invention, therefore, is to provide a method of curing coating compositions which is quick and which provides a cured coating composition which is sufficiently hard as to allow handling, stacking and storage of the substrates shortly after coating whilst eliminating or at least significantly reducing the amount of blocking damage to the surface of the cured coated substrate. The present invention also aims to provide an efficient method suitable for curing coating compositions which do not contain a coalescent.

Thus, the present invention provides a method of curing a waterborne coating composition comprising the steps of:

a) applying the waterborne coating composition, which comprises polymer solids of which at least 5% by weight thereof is UV curable, to a substrate;

b) irradiating the coated substrate with microwave radiation; and c) irradiating the coated substrate with UV radiation.

The combination of irradiating a coating with microwave and UV radiation advantageously overcomes the productivity problems associated with using microwave treatment alone and the productivity problems of using conventional UV curable coatings (either a composition containing in part a UV-curable component or a composition formed from 100% UV containing thermoset coating). Microwave drying by itself suffers from poor productivity (the panels are not stackable after the evaporation of the water) and UV-curing waterborne coatings suffer from poor productivity (they typically require up to 10 minutes or more drying time after application before they can be UV cured) yet, when combined, these two techniques surprisingly offer a highly productive coating process, enabling coated substrates to to handled and stacked shortly after treatment without fear of the substrates sticking together. The process can enable the coating on the substrate to be cured sufficiently enough for the substrate to be used, handled, stacked and/or stacked approximately 90 seconds after the coating was applied: microwave drying of the coating can take as little as 60 seconds from application, and UV-curing of the dried coating can take as little as 30 seconds.

Preferably the coating composition comprises at least 25% by weight, based upon the total weight of polymer solids in the coating composition, of a UV curable component, and particularly preferable is a composition which comprises polymer solids of which at least 50% by weight is UV curable.

The UV curable component may be selected from one of two main categories: 1.) free radical polymerised (meth)

acrylate functionalised polymers and 2.) cationically polymerised epoxies, which categories are well known and well documented in the art. (Meth)acrylate functionalised polymers generally comprise (meth)acrylate-functional oligomers and monomers combined with a photoinitiator to facilitate UV cure. These (meth)acrylate functional oligomers are typically prepared by a) reaction of difunctional epoxies with (meth)acrylic acid, b) the reaction product of difunctional isocyanates with hydroxy-functional (meth) acrylates, or c) the condensation product of (meth)acrylic acid and hydroxyl groups on a polyester backbone, or an hydroxy(meth)acrylate with residual acid groups on a polyester backbone. Cationic systems tend to be based on cycloaliphatic epoxies and a photoinitiator which decomposes to give a "super" acid with UV radiation. The super acid catalyses the cationic polymerisation of the epoxy. A general description of these systems can be found in Radiation Curing in Polymer Science and Technology, Vol 1: Fundamentals in Methods, Edited by J P Fouassier and J E Rabek, Published by Elsevier Applied Science (1993).

The coating composition used in the method of the present invention may also contain a thermoplastic component, which is preferably between 0 and 95% by weight, based upon the total weight of polymer solids in the coating composition. Such a combination of thermoplastic and UV curable components has not hitherto been used in the same coating composition; UV coatings are regarded as high performance coatings, whereas thermoplastic coatings are regarded as not being able to attain the same high level of hardness and/or chemical resistance as compared with the cross-linked UV coatings. In other words, the two types of coatings are used in mutually exclusive applications and mixing the two types of coatings together is not something which the skilled person would use since no synergistic effects are observed.

Suitable thermoplastic materials are those typically found in conventional latex paints including, for example, waterborne or water-dilutable polymers such as poly(meth) acrylates, styrene-acrylics, vinylics, ethylene-vinyl-acrylic terpolymers, alkyds, polyesters, polyurethanes, nitrocellulose, cellulose-acetate-butyrate, polyethers, polyamides, epoxy-esters, or vinyl halides. Preferably, the thermoplastic material is a homopolymer or copolymer formed from polymerisation of one or more of the following monomers: ethylene, a vinyl monomer; an acrylate monomer such as methyl acrylate, ethyl acrylate, ethyl methacrylate; an alkenyl aromatic monomer such as styrene, methyl styrene, dimethyl styrene, diethyl styrene, chlorostyrene and isopropyl styrene; an acrylamide monomer such as ethyl acrylamide and methyl acrylamide; and an alkadiene monomer such as butadiene, and isoprene. Typical vinyl monomers include, but are not limited to, vinyl halides, vinylidene halides, vinyl acetate, and acrylonitrile. Chlorine and bromine are exemplary halide moities of vinyl halide and vinylidene halide monomers. The thermoplastic materials can be made in a conventional manner.

As an alternative to a thermoplastic component, the coating composition may also comprise a 2-pack or 2 component system which comprises 2 components which are normally stored in separate containers and when they are mixed together immediately prior to application, form a thermosetting polymer by a chemical reaction as opposed to UV irradiation. The method of the present invention has application in such a coating composition system since the UV component of the coating composition may be cured by UV radiation to form a hardened coating, before the 2-pack components have had a chance to react together; thereby improving productivity of applying such a coating composition. Suitable thermosetting materials might include for example water-borne or water-dilutable polyols-polyisocyanates, polyamines-epoxies, carboxyl functional acrylics-epoxies, carboxyl functional acrylics-carbodiimides.

The step of irradiating the coated substrate with UV radiation may be prior to, subsequent to or concomitant with the step of microwave radiation, but it is preferred to irradiate the coated substrate with UV after the microwave irradiation step is substantially complete.

The composition can also contain other ingredients conventionally used in latex paints.

Conventional UV curing equipment and procedures can be used in the process of the present invention. Similarly, conventional microwave drying equipment and procedures, such as those described in WO 90/02613, can be used in the process of the present invention.

In another aspect of the present invention, there is provided apparatus for curing a waterborne coating composition, comprising an UV curable component in an amount of at least 5% by weight, based on total polymeric solids in the composition, which has been applied to a substrate, wherein the apparatus comprises a source of microwave radiation and a source of UV radiation each locatable near to the coating and each capable of emitting sufficient radiation onto the coating that, together, they are capable of causing the coating to cure within a period of three minutes, preferably 2 minutes and more preferably 1.5 minutes, of exposure of the coating to the radiation. After the period of exposure, the coating may be sufficiently cured for the coated substrate to be used, handled, stacked and/or stored as required.

The substrates which may be coated using the method of the invention comprise at least in part any of the materials selected from the group containing cellulose, such as wood and paper, and cellulose composites, such as MDF, hardboard and particle board; plastics; metals; mineral substrates; and building materials, such as tarmac, brick and cement; and any composite material comprising one or more of these materials.

Advantageously, the substrate is a road and the composition is a road marking paint which may additionally comprise reflective beads, preferably glass beads, such as are normally employed in such paints, or the substrate is a cellulose composite eg for interior furniture applications and the waterborne composition is a sealant.

The present invention will now be described with reference to the following examples.

EXAMPLE 1A

This Example illustrates that the method disclosed in WO/90/02613, when used to dry a thermoplastic acrylic dispersion polymer (a TP polymer) gives a dry-through coating when tested using thumb print test, ASTM D1640-83 part 7.6 and this is advantageous over a traditionally dried thermoplastic coating using thermal convection drying.

A waterborne coating containing a TP polymer (Formulation TP) is applied by conventional spray application to a glass plate (80g wet coating/m$^2$) and the coating is passed through a commercial microwave dryer. The coating emerges 2 minutes later and is dry-through as defined by ASTM D1640-83 part 7.6 By measuring the weight before and after passage through the microwave dryer, we noted that the coating lost about 48 g/m$^2$ which is close to the theoretical limit of weight loss for this coating. The same TP polymer coating when applied in the same manner to a glass plate and dried at 50° C. (a commonly used temperature in the coatings industry) in a thermal convection oven is not dry-through; (ASTM D1640-83 part 7.6 failed) after 2 minutes of baking. In the same manner, the weight loss was followed and found to be only about 15 g/m². This demonstrates that the microwave dryer is more efficient at removing water than the thermal convection oven.

Formulation TP

| Ingredient | Weight Parts | Source |
|---|---|---|
| Primal E-2955 (37%) (Thermoplastic acrylic dispersion) | 85.33 | Rohm and Haas Co., Philadelphia, PA, USA |
| Water | 2.13 | city mains |
| Zinplex 15 (Ionic crosslinker) | 1.70 | Ultra-Additives, Lehmann and Voss, Hamburg, Germany |
| Butyl glycol (coalescent) | 5.25 | Union Carbide, New Jersey, USA |
| Byk 024 (defoamer) | 0.09 | Byk Chemie Wesel, Germany |
| Tego Foamex 800 (defoamer) | 0.37 | Tego Chemie, Essen Germany |
| Deuteron MK (matting agent) | 0.79 | Schoener, Bremen, Germany |
| Michem 39235 (wax emulsion) | 1.39 | Michelman, Cincinnati, Ohio, USA |
| Mobilcer M (wax emulsion) | 2.48 | Mobil, Paris, France |
| Acrysol SCT-275 non-ionic rheology modifier) | 0.48 | Rohm and Haas Co. |
| TOTAL | 100.00 | |

Approximately 34% weight solids.

EXAMPLE 1B

This Example shows that the coating composition of Example 1A when dried according to WO/90/02613, is surprisingly inefficient at producing a hard, stackable coating.

The same waterborne coating (Formulation TP) is spray applied in two coats (60 g of wet coating/m² per coat) to two flat oak veneer panels (17 cm×23 cm) using the following application and drying procedure: Air-spray application followed immediately by T1 minutes in a drying device, followed by sanding with No. 320 stearated sand paper, followed by air-spray application of the second coat, followed immediately by T2 minutes in a drying device. After application and drying of two coats, the panels are immediately tested for blocking resistance by placing them painted sides together and storing under a pressure of about 255 kg/m² for a minimum of three hours. After this storage, the panels are separated and the amount of difficulty to separate them along with the amount of damage to the painted surfaces is noted. The results of the blocking tests are shown in Table 1 below.

TABLE 1

| Drying device | T1, mins | T2, mins | Blocking Test Results: Difficulty to separate | Blocking Test Results: % surface damaged |
|---|---|---|---|---|
| Microwave | 2 | 2 | hard to separate by hand | 33 |
| Thermal Convection Oven | 2 | 2 | Impossible to separate | 100 |
| Thermal Convection Oven | 10 | 10 | No sticking whatsoever | 0 |

Percentage surface damaged is measured by visual inspection of the panels.

EXPERIMENT 2A

The waterborne, UV-curing coating described in Formulation UV is spray applied to a black plastic substrate (60 g of wet coating/m²) which is then passed through a microwave drying device for 2 minutes. After microwave drying, the coating is dry-through as defined by ASTM D1640-83 part 7.6, in addition, the coating is very transparent and shows no milkiness nor haziness due to trapped water.

Formulation UV

| Ingredient | Weight Parts | Source |
|---|---|---|
| Primal E-3120 (40%) (UV curable acrylic dispersion) | 91.04 | Rohm and Haas Co., Philadelphia, PA, USA |
| Darocur 1173 (photoinitiator) | 0.55 | Ciba-Geigy, Basel, Switzerland |
| Water | 5.30 | city mains |
| Tego Glide 410 (antiscratch agent) | 0.23 | Tego Chemie, Essen, Germany |
| Surfynol 104 H (non-ionic surfactant) | 0.73 | Air Products, Allentown, PA, USA |
| Acrysol RM-8W (diluted to 5% in water) (non-ionic rheology modifier) | 0.69 | Rohm and Haas Co. |
| Deuteron MK (matting agent) | 0.79 | Schoener, Bremen, Germany |
| TOTAL | 100.00 | |

Approximately 39% weight solids.

EXPERIMENT 2B

After applying the UV-curing coating to the substrate as described in Experiment to 2A, the coating is dried in a thermal convection oven for 2 minutes. However, after this treatment, the film is not dry-through and is hazy (presumably due to water still trapped in the film). As observed with the completely thermoplastic coating (Experiment 1A), the drying of a waterborne, UV-curing coating with a microwave device is more efficient than with a thermal convection oven.

EXPERIMENT 3

The two previously mentioned waterborne coatings (Formulations TP and UV) are blended in the weight ratios shown below to produce three more waterborne coatings. These five waterborne coatings are described in Table 2.

TABLE 2

| | COMPOSITION | |
|---|---|---|
| Formulation Reference | Weight Parts of Formulation TP | Weight Parts of Formulation UV |
| TP | 100 | 0 |
| Blend 1 | 75 | 25 |
| Blend 2 | 50 | 50 |
| Blend 3 | 25 | 75 |
| UV | 0 | 100 |

The five waterborne varnishes listed in Table 2 are spray applied in two coats (45 g of wet coating /$m^2$ for each coat) to two flat oak veneer panels (17 cm×23 cm) using the following application and drying procedure: Air-spray application followed immediately by 2 minutes in a microwave drying device, in some cases (see Table 3) this is followed by 30 seconds in a UV-curing device (full scale model from the Superfici Co., Monza, Italy using 2 mercury lamps of 11 kW each) followed by sanding with No. 320 stearated sand paper, followed by air-spray application of the second coat, followed immediately by 2 minutes in a microwave drying device, in some cases (see Table 3) followed by 30 seconds in a UV-curing device (full scale model from the Superfici Co., Monza, Italy using 2 mercury lamps of 11 kW each). After application and drying of two coats, the panels are immediately tested for blocking resistance by placing them painted sides together and storing under a pressure of about 255 kg/$m^2$ for a minimum of three hours. After this storage, the panels are separated and the amount of difficulty to separate them along with the amount of damage to the painted surfaces is noted. The results of the blocking tests are shown in Table 3 below.

TABLE 3

| | | Blocking Test Results | |
|---|---|---|---|
| Formulation Reference | UV Exposure? | Difficulty to separate | % surface damaged |
| TP | No | Impossible to separate | 100 |
| TP | Yes | Impossible to separate | 100 |
| Blend 1 | No | Much force required | 50 |
| Blend 1 | Yes | Some force required | 33 |
| Blend 2 | No | Impossible to separate | 100 |
| Blend 2 | Yes | Very slight force required | 0 |
| Blend 3 | No | Much force required | 33 |
| Blend 3 | Yes | No sticking whatsoever | 0 |
| UV | No | Much force required | 33 |
| UV | Yes | No sticking whatsoever | 0 |

From the blocking resistance results in Table 3 it is clearly shown that a waterborne coating which is microwave dried and not given UV radiation has no block resistance. In the absence of UV exposure, all of the five formulations have very poor blocking resistance that renders them essentially unusable on a modem, industrial finishing line. Even though the microwave drying is appropriate for the quick elimination of the water, surprisingly enough it does not yield the block resistance (stackability) needed and thus can not be used in practice.

The only combination that allows for some level of block resistance (and hence allows for its commercial use) is to use a varnish that contains at least a minor part of a polymer or pre-polymer that is capable of curing under UV radiation and drying it by microwave and UV radiation. As can be seen from Table 3, to reduce the damage caused to the surface in the above described blocking test the coating composition must contain a UV-curable component.

I claim:

1. A method for curing a waterborne coating composition, comprising a thermoplastic component and a UV curable component, comprising the steps of:

a) applying the coating composition, comprising polymer solids of which at least 5% by weight thereof is UV curable, to a substrate;

b) irradiating the coated substrate with microwave radiation; and c) irradiating the coated substrate with UV radiation.

2. A method according to claim 1, wherein the polymeric solids portion of the coating composition comprises at least 25% by weight of a UV curable component.

3. A method according to claim 1, wherein the polymeric solids portion of the coating composition comprises at least 50% by weight of a UV curable component.

4. A method according to claim 1, wherein the coating composition comprises a thermoplastic component which is a homopolymer a copolymer formed from polymerization of one or more of the following monomers: ethylene: a vinyl monomer: an acrylate monomer; an alkenyl aromatic monomer: an acrylamide monomer: and an alkadiene monomer.

5. A method according to claim 1, wherein the substrate comprises at least in part any of the materials selected from the group containing cellulose and cellulose composites; plastics; metals; mineral substrates; and building and construction materials; and any combination or composite thereof.

6. A method according to claim 1, wherein the coating is a waterborne road-marking paint and the substrate is a road.

7. A method of curing a waterborne coating composition according to claim 1, wherein the coating composition is applied to the substrate in layers either as the sole coating composition or in conjunction with a second coating composition.

8. A method according to claim 7, wherein the second coating composition does not contain an UV curable component.

* * * * *